(12) United States Patent
McCobb

(10) Patent No.: US 10,171,675 B1
(45) Date of Patent: Jan. 1, 2019

(54) AUTOMATED INTELLIGENT PERSONAL REPRESENTATIVE

(71) Applicant: Open Invention Network, LLC, Durham, NC (US)

(72) Inventor: Gerald McCobb, Delray Beach, FL (US)

(73) Assignee: Open Invention Network, LLC, Durham ( * ) Notice: Subject to any disclaimer, the term of this patent is extended or adjusted under 35 U.S.C. 154(b) by 25 days.

(21) Appl. No.: 15/289,665

(22) Filed: Oct. 10, 2016

(51) Int. Cl.
| | |
|---|---|
| H04M 3/54 | (2006.01) |
| H04M 3/51 | (2006.01) |
| G10L 15/18 | (2013.01) |
| G10L 15/19 | (2013.01) |
| H04M 3/533 | (2006.01) |
| G10L 15/26 | (2006.01) |

(52) U.S. Cl.
CPC ......... *H04M 3/541* (2013.01); *G10L 15/1815* (2013.01); *G10L 15/19* (2013.01); *H04M 3/5166* (2013.01); *H04M 3/5191* (2013.01); *G10L 15/265* (2013.01); *H04M 3/53333* (2013.01); *H04M 2203/2061* (2013.01); *H04M 2203/357* (2013.01)

(58) Field of Classification Search
CPC .... H04M 3/51; H04M 3/4878; H04M 3/5175; H04M 3/5183; H04M 2203/1058; H04M 3/5191; H04M 3/4935; H04M 1/72502; H04M 3/44; H04M 11/04; H04M 2203/105; H04M 2207/18; H04M 2242/22; H04M 3/12; H04M 3/42042; H04M 3/42059

USPC ............ 379/265.09, 218.01, 201.01, 265.01, 379/266.01, 266.07, 309, 38, 142.06, 379/207.15, 265.13, 266.06, 40, 67.1, 379/114.15, 1.02, 201.02, 210.01, 211.02, 379/223, 242, 265.02, 265.11, 32.02, 379/32.04, 41, 433.06, 51, 68, 70, 88.01, 379/88.16, 88.18, 88.23

See application file for complete search history.

(56) References Cited

U.S. PATENT DOCUMENTS

| | | |
|---|---|---|
| 6,181,780 B1 | 1/2001 | Finnigan |
| 6,212,408 B1 | 4/2001 | Son et al. |
| 6,731,725 B1 | 5/2004 | Merwin et al. |
| 6,829,603 B1 | 12/2004 | Chai et al. |
| 7,437,291 B1 * | 10/2008 | Stewart ................. G10L 15/193 704/10 |
| 7,693,520 B2 | 4/2010 | Kang et al. |
| 7,912,910 B2 | 3/2011 | Bannerjee et al. |
| 8,401,163 B1 | 3/2013 | Kirchhoff et al. |
| 8,417,224 B1 | 4/2013 | Young |
| 8,543,834 B1 | 9/2013 | Barra |
| 8,620,657 B2 | 12/2013 | Farrell et al. |
| 8,630,961 B2 | 1/2014 | Beilby et al. |
| 8,712,385 B2 | 4/2014 | Young et al. |
| 8,903,716 B2 | 12/2014 | Chen et al. |

(Continued)

*Primary Examiner* — Akelaw Teshale

(57) ABSTRACT

A virtual assistant application, system, and service that interacts with a caller over a telephone, cellular, or VoIP network as the called party's representative when the called party is unavailable, providing answers to queries and performing commands that were provisioned by the called party. The application includes a telephony interface, speech recognition and synthesis, a dialog manager, and knowledge domain. The application can also be configured to interact with a sender of SMS, MMS, or IM messages.

20 Claims, 6 Drawing Sheets

(56) References Cited

U.S. PATENT DOCUMENTS

| | | |
|---|---|---|
| 9,117,447 B2 | 8/2015 | Gruber |
| 9,123,345 B2 | 9/2015 | Khanna et al. |
| 9,190,075 B1 | 11/2015 | Cronin |
| 9,313,108 B2 | 4/2016 | Gruber et al. |
| 9,313,328 B2 | 4/2016 | Vendrow et al. |
| 2003/0182131 A1* | 9/2003 | Arnold .................... G10L 15/32 704/275 |
| 2013/0040615 A1* | 2/2013 | Sawhney ................ H04W 4/50 455/414.1 |

* cited by examiner

AUTOMATED INTELLIGENT PERSONAL REPRESENTATIVE

FIELD

The present solution relates to intelligent agents and more particularly, to an automated intelligent personal representative.

BACKGROUND

An intelligent agent includes a voice-activated assistant that can perform many useful tasks like look up the weather and show local show times for a movie or a concert. In response to a user's query the agent will access Internet search, localization technologies and the user's calendar, e-mail, and other applications on the mobile device and the Internet.

Voice-activated assistants do not have the ability to interact with someone on the user's behalf. The assistant is installed on the user's device to respond directly to user queries and commands. It performs tasks for the user only while interacting with the user. SMS and chat services are also available on the Internet that are similar in function to voice-activated assistants. These services also require the user's active interaction. An auto attendant, or virtual receptionist, answers and transfers calls on behalf of a business or organization. An attendant can offer a caller a DTMF menu system, for reaching specific extensions, and/or an Interactive Voice Response to identify the caller and reason for the call. An auto attendant, or IVR, generically represents an organization but does represent, or perform tasks on behalf of, a single user.

Therefore, what is needed is a personal representative that can perform actions on behalf of a user.

BRIEF SUMMARY

In one embodiment, a method comprises one or more of: receiving a call at a device, when the call is unanswerable, forwarding, by the device, the call to a personal representative, detecting, by a telephony network interface of the personal representative, ringing, performing, by a communication programming interface, directing the network interface to answer the call, starting an instance of a dialog manager and directing the dialog manager to load an application and knowledge domain associated with the answered call, forwarding, to the communication programming interface, a language model and grammars to be installed with an automatic speech recognition module, outputting, from the automatic speech recognition module, a list of matches with a corresponding confidence score, providing a best match to the dialog manager; updating, by the dialog manager, a dialog context and engaging in a dialog, by the personal representative, with a caller device based on the dialog context.

In another embodiment, a non-transitory computer readable medium comprises instructions that, when read by a processor, cause the processor to perform one or more of: receiving a call at a device, when the call is unanswerable, forwarding, by the device, the call to a personal representative, detecting, by a telephony network interface of the personal representative, ringing, performing, by a communication programming interface, directing the network interface to answer the call, starting an instance of a dialog manager and directing the dialog manager to load an application and knowledge domain associated with the answered call, forwarding, to the communication programming interface, a language model and grammars to be installed with an automatic speech recognition module, outputting, from the automatic speech recognition module, a list of matches with a corresponding confidence score, providing a best match to the dialog manager, updating, by the dialog manager, a dialog context and engaging in a dialog, by the personal representative, with a caller device based on the dialog context.

In a further embodiment, a system comprises one or more of: a device configured to receive a call, when the call is unanswerable, the device is configured to forward the call to a personal representative, a telephony network interface of the personal representative configured to detect ringing, a communication programming interface configured to: direct the network interface to answer the call, start an instance of a dialog manager and direct the dialog manager to load an application and knowledge domain associated with the answered call, wherein a language model and grammars to be installed with an automatic speech recognition module are forwarded to the communication programming interface, wherein a list of matches with a corresponding confidence score are output from the automatic speech recognition module, wherein a best match is provided to the dialog manager, wherein the dialog manager updates a dialog context and wherein the personal representative engages in a dialog with a caller device based on the dialog context.

BRIEF DESCRIPTION OF THE DRAWINGS

FIG. 7-1 illustrates an example flow chart, showing an example of how the present solution manages a dialog between the Personal Representative and the caller.

FIG. 7-2 continues the flow chart of FIG. 7-1.

DETAILED DESCRIPTION

Figure 1:
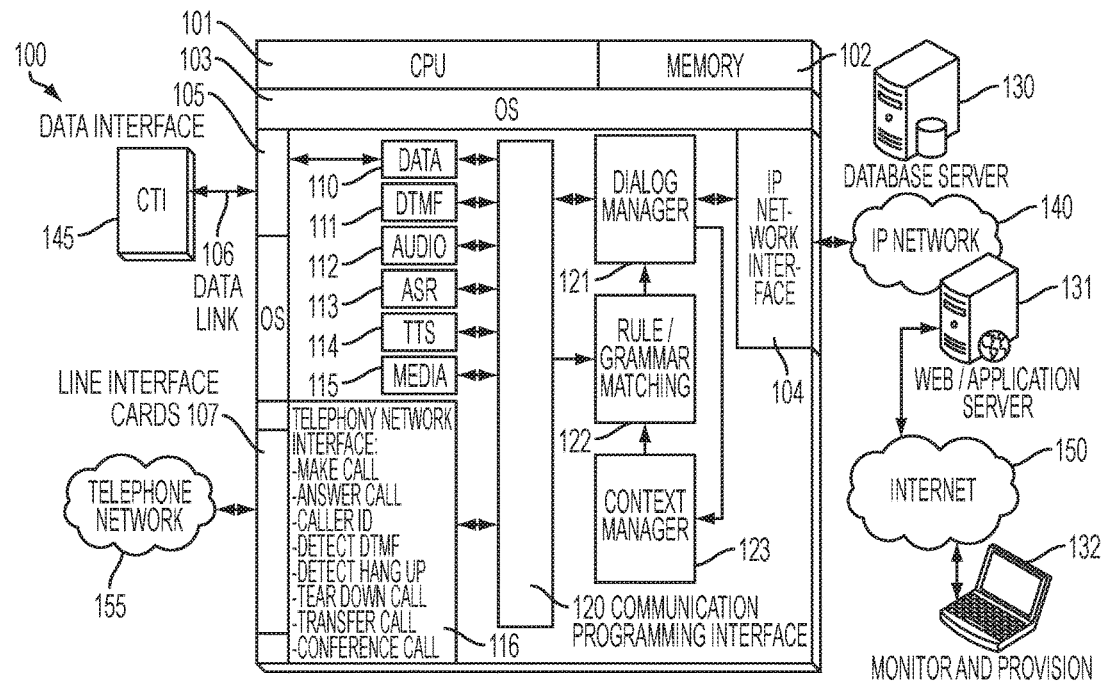
FIG. 1 illustrates an example architecture view of the present solution and its components.

It will be readily understood that the instant components, as generally described and illustrated in the figures herein, may be arranged and designed in a wide variety of different configurations. Thus, the following detailed description of the embodiments of at least one of a method, apparatus, and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

The present solution relates to intelligent agents that can perform tasks on someone's behalf. In particular, the intelligent agent is a personal representative for someone who is busy, away, or otherwise not available. As part of a public or private phone network, the personal representative can answer a phone call, screen the caller, transfer the call, ask and answer questions, make or cancel appointments, etc. The personal representative can also answer and respond to an on-line chat request or SMS message, and participate in an on-line meeting or discussion.

The present solution is a Personal Representative that can automatically answer phone calls or SMS, MMS, or IM messages on a user's behalf. The Personal Representative is intelligent in that it can respond to user queries and commands based on its domain knowledge, also known as its ontology, as configured by the user.

Several embodiments are presented herein.

The present solution may be installed as part of a mobile phone carrier's cellular network. In this embodiment, a user's Personal Representative handles a phone call when the user is busy or cannot be reached. Generally, the network's Mobile-service Switching Center (MSC) routes a busy or no-answer call to a voicemail system (VMS), but a Personal Representative System may either replace the VMS or will transfer the call to the VMS, upon the caller's request.

The present solution may be installed in a company's private network that has a Private Branch Exchange (PBX), with Computer Telephony Integration (CTI) and (optional) Automated Call Distribution (ACD), to route calls to one of its departments or employees. In this embodiment, the Personal Representative System may either replace the VMS or transfer calls to the VMS after the Personal Representative answers each call. The present solution may be installed in the cloud as a service. A user account will have its own phone number for accessing the user's own Personal Representative and the user can setup call forwarding to the Personal Representative from a landline (POTS) or mobile phone (GSM/GPRS/LTE, or CDMA) using the appropriate activation code (see the Call Forwarding section in the Appendix).

SMS and MMS messages may be routed to the Personal Representative cloud service from a mobile device that supports installing an "app" that enables forwarding messages. While the GSM standard includes an activation code for forwarding SMS messages (*21*[phone number]*16#). US mobile network carriers may not support it. In another embodiment, the present solution may participate in an on-line chat or meeting that the user usually accesses with an instant messaging app installed on the mobile device. If the app supports one of the message network protocol standards, the Personal Representative can be setup to be an instant messaging app client. If supported, the Personal Representative may also be setup as a web client.

Additional components added to the present solution support voice authentication and secure access to the user's calendar and contact information stored in the cloud. Access to a machine learning service improves understanding of input queries and responses that are appropriate in context and mimic the user's personality.

Methods, non-transitory computer readable media, devices and systems are presented for providing automatic personal assistance to a caller or SMS, MMS, or IM user, when the called party (also known as the intended call or message recipient) is busy or unavailable. The personal assistance intelligently represents the called party in that it can accurately interpret speech or text input and answer queries based on the knowledge domain that was provisioned by the called party. The domain knowledge contains the answers the called party would give to the caller or message sender if the called party were present and available.

The caller's phone can be a landline or analog telephone using a Public Switched Telephone Network (PSTN), a mobile device using a mobile phone cellular network, or a softphone, web phone, or desktop application using a Voice-over-IP (VoIP) network protocol such as SIP or H.323. Message sending over SMS and MMS is primarily restricted to mobile phones that send data over the cellular network to the cellular network's store and forward gateway (SMSC or MMSC). However, there are SMS and MMS gateway services available for web and desktop clients. An Instant Messaging (IM) client can access the personal representative using an IM protocol supported by both the sender and the personal representative such as XMPP.

FIG. 1 illustrates an exemplary architecture 100 for a personal representative system that responds to calls that were forwarded because the called parties were busy or not available. The architecture has components in common with both Interactive Voice Response (IVR) and Voicemail systems. These components are the CPU 101 that runs the Operating System (OS) 101 and Communication Programming Interface 120 and Dialog Manager 121 software, Telephony Network Interface 116 to multiple hardware Line Interface Cards 107, Data Interface 105 to Data Link 106, connected to either a mobile phone carrier's SS7 network or a Computer Telephony Integration (CTI) interface 145, and IP Network Interface 104, connected to Database Server 130 and Web/Application Server 131, residing on internal IP Network 140.

The Database Server 130 stores a directory of all called party accounts that includes each called party's profile, with name, extension number, caller passcode (if required), knowledge domain, grammars, and audio clips, and the called party's application that is loaded and interpreted by the Dialog Manager 121.

The Web/Application Server 131 retrieves each called party's application and files from the Database Server 130 when requested by the Dialog Manager 121. It also provides a visual application to each called party for creating and updating the application and its knowledge domain stored in Database Server 130 from a desktop or laptop computer 132 connected to the Internet 150. The called party may also view the application's call history, usage statistics, and health.

The Communication Programming Interface 120 controls the following internal software modules: Data 110 forwards data received from the Data Link 106, DTMF 111 processes the Dual-tone multi-frequency signals entered by the caller, Audio 112 plays audio clips, Automatic Speech Recognition (ASR) 113 processes the caller's voice input against the acoustic and language models stored with the called party's knowledge domain, Text-to-Speech (TTS) 114 converts text responses generated by the application to voice output, and Media 115 assists with encoding and decoding audio data. A user with a personal representative system account can direct the user's telephone or mobile phone carrier to forward calls when the user's device is busy, unavailable, or unconditionally by entering the appropriate code sequence into the device (see the appendix for the codes supported in the US and Europe). A unique telephone number for each account is assigned to each of its Line Interface Cards 107. In some embodiments, the line interface cards connect to a PSTN. In other embodiments, a VoIP gateway connects to a PSTN and an IP router that connects to the VoIP gateway replaces the line interface. The assigned telephone numbers are mapped from the PSTN telephone number system to their IP addresses. In some embodiments, the telephone number mapping is performed according to the E.164 Number Mapping (ENUM) standard. When a called party "B" with personal representative account is busy or not available, a call from "A" is forwarded to the personal representative by the called party's telephone or mobile phone carrier, or if the personal representative is installed within a company's internal phone network, by the company's Private Branch Exchange (PBX). The personal representative's Telephony Network Interface 116 detects ringing. At the same time, the data sent to the Data Interface 105 across the Data Link 106 contains the caller A's phone number, or company extension, caller ID, if available, and the phone number that is ringing. The Communication Programming Interface 120 directs the Telephony Network Interface 116 to answer the call, starts an instance of the Dialog Manager 121, and directs the Dialog Manager 121 to load the application and knowledge domain associated with the answered number. The Dialog Manager 121 requests the application and knowledge domain from the Web/Application Server 131. The Web/Application 131 requests the application and knowledge domain for called party "B" associated with the answered number from the Database Server 130, pre-loads the application, and returns an initial set of application files to the Dialog Manager 121. The language model and grammars are given to the Communication Programming Interface 120 to be installed with ASR 113. The Dialog Manager 121 plays an initial prompt for the caller, such as "Hello, B is not available, but I represent B. How may I help you?" The prompt is given to the Communication Programming Interface 120 to be played by TTS 112.

In response, caller "A" may ask for "B's" location, when "B" will be available, to leave a message, or how to reach B if there is an emergency. ASR 113 processes caller "A's" voice input against the set of grammars installed in "B's" knowledge domain. Output from the ASR 113 is a list of matches (the N-best list) with a confidence score assigned to each one. The list is given to the Communication Programming Interface 120 and forwarded to Rule/Grammar Matching 122. Rule/Grammar Matching 122 analyzes each match for accuracy against the conversation context maintained by Context Manager 123 and selects the best one. The selected match is given to the Dialog Manager 121. Dialog Manager 121 updates the dialog context maintained by Context Manager 123 and requests more files from the Web/Application Server 131.

The dialog between the caller and the called party's personal representative continues until either the caller or personal representative hangs up the call or the personal representative transfers the call, or adds the caller to a conference call in progress. After the call has ended, the Dialog Manager 121, requests the Web/Application Server 131 to unload the application. The Dialog Manager 121 instance is terminated and the OS 103 reclaims its memory resources. Before unloading the application, the Web/Application 131 saves information about the call, including caller ID, name if provided, date and time, and telephone number, to the Database Server 130. "B" later calls the phone number associated with "B's" personal representative account. The Telephony Network Interface 116 detects ringing for one of its line interface cards and informs the Communication Programming Interface 120. The data from the Computer Telephony Interface 145 contains data indicating that this is a direct call. Steps are repeated as before to answer the call and load "B's" account application. When the account application is loaded, the Dialog Manager 121 instance plays a prompt, requesting "B" enter a passcode. After "B" enters the passcode, "B" can ask who called and when, if there was a message, and to be transferred to a voicemail account or to the phone number of one of the callers.

As before, when "B" hangs up the call, or is transferred to another number, the Web/Application Server 131 unloads the application, the Dialog Manager 121 instance is terminated, and the OS 103 reclaims its memory resources.

In some embodiments, ASR 113 and TTS 114 modules link to services provided by a remote speech recognition and TTS server. In some embodiments, services include speech verification. This service will verify the identity of a caller against a voice print file stored in a Database Server 130 database. In other embodiments, ASR 113, TTS 114, and voice verification are local software modules that reside with the personal representative system 100.

In some embodiments, the Dialog Manager 121 is a VoiceXML interpreter that interprets an XML application according to its Form Interpretation Algorithm (FIA). For this embodiment, Rule/Grammar Matching 122 and Context Manager 123 are optional. In other embodiments, the Dialog Manager 121 is able to understand context and a large natural language subset with the assistance of Rule/Grammar Matching 122 and Context Manager 123.

Figure 2:
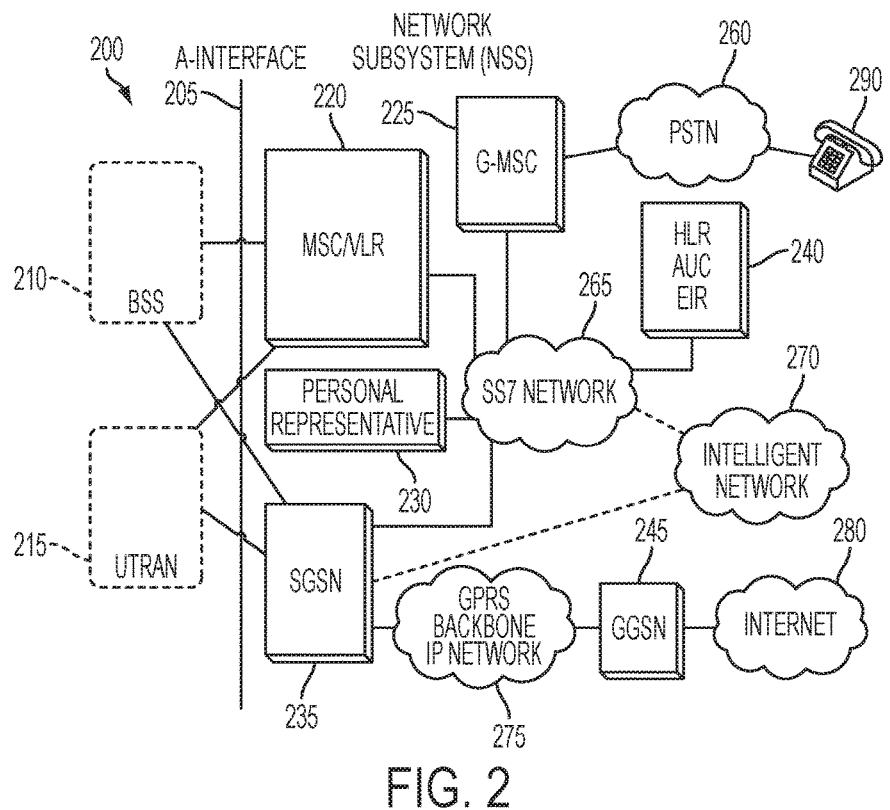
FIG. 2 illustrates an example architecture view of the present solution within a cell phone carrier's cellular network.

As the called party's personal representative, it can in some embodiments transfer a call or message either to the called party's second device, or to a third party. For example, the called party can provision the personal representative's knowledge domain with the name and telephone number of someone to contact in case of an emergency. In some embodiments, the personal representative is a service installed in a mobile phone carrier's LTE, CDMA, UMTS or GSM core network. FIG. 2 illustrates a view of a UMTS network 200, which extends the GSM Network Switching Subsystem NSS 201 with the GPRS backbone IP Network 275. The Base Station Subsystem BSS 210 and Universal Terrestrial Radio Access Network UTRAN 215 provide the wireless network and equipment for mobile phones to connect to the NSS 201. The Home Location Register/Authentication Center/Equipment Identity Register HLR/AUC/EIR 240, Mobile Services Switching Center/Visitor Location Register MSC/VLR 220, Gateway MSC 225, Personal Representative 230, and Serving GPRS Support Node SGSN 235 are connected to the SS7 signaling network 265. The HLR 240 contains all mobile phone subscriber and service information, including call forwarding. The MSC/VLR 220 routes the call to the Personal Representative 230 when a signal returned from the called party's phone informs the MSC/VLR 220 that the phone was not answered, after the HLR 240 looks up the call forwarding information.

Figure 3:
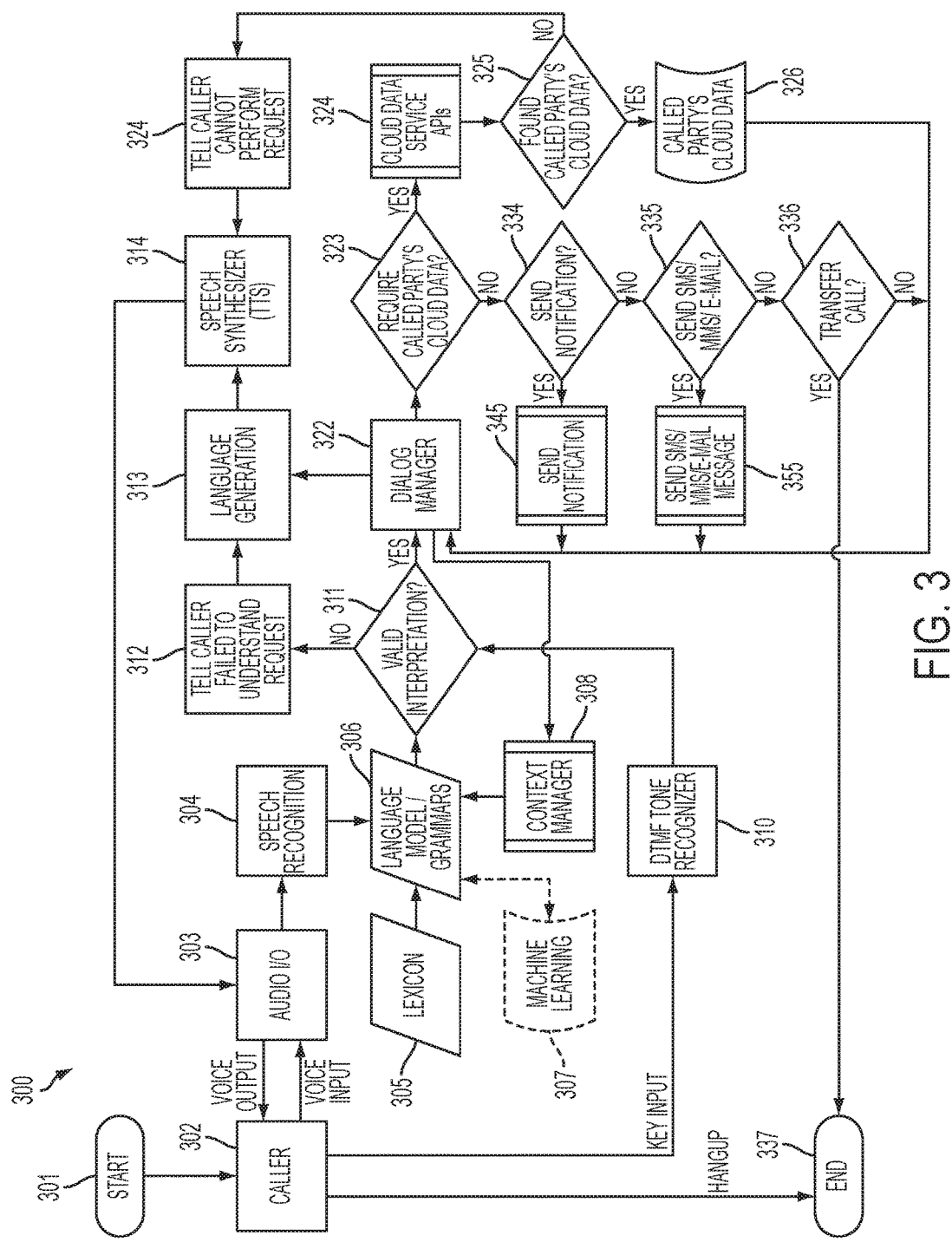
FIG. 3 illustrates an example flow chart, showing the flow of control between the Personal Representative components when a phone call is answered.

FIG. 3 illustrates the flow of control 300 between application components when processing the caller's voice input after the personal representative answers the forwarded call. The Dialog Manager 322 runs the application that interacts with the caller. When the call is answered at Start 301 the Dialog Manager 322 directs the Language Generation 313 to play a prompt welcoming the caller 302. The Language Generation 313 forwards the prompt to the Speech Synthesizer (TTS) 314 and the prompt is played for Caller 302 by Audio I/O 303. The Dialog Manager 322 waits for voice input from Caller 302. Caller 302's voice response is gathered by Audio I/O 303 and forwarded to Speech Recognition 304. Speech Recognition 304 attempts to match the caller's voice input against the called party's knowledge domain, which encompass the Lexicon 305, Language Model/Grammars/Acoustic Model 306, optional Machine Learning 307, and Context Manager 308.

If the knowledge domain doesn't understand the caller's voice input, the Dialog Manager 322 a generates response that it failed to understand the request 312, which is forwarded to the Language Generation 313 and Speech Synthesizer 314 to be played to the Caller 302 by Audio I/O 303.

If the knowledge domain understands the caller's voice input, the Dialog Manager 322 proceeds to perform the task directed by the application. The Dialog Manager 322 checks whether the task requires accessing the called party's cloud data 323, such as calendar information for making an appointment. If cloud data is required, one or more Cloud data service API calls 324 are made to retrieve the data securely from the cloud. If the Cloud data is successfully retrieved 326 the Dialog Manager 322 generates a voice response 313 for Caller 302 that is played by the Audio I/O 303, and waits for Caller 302's next voice input.

If cloud data is not required to perform the task, the Dialog Manager 322 checks whether Caller 302 wants a notification sent 334 to the called party's mobile phone or desktop browser. Apple iOS and Google Android notifications are sent to an app installed on the called party's mobile phone. The Dialog Manager 322 must check whether it has the information it needs to send the notification.

After sending the notification or SMS, MMS/E-mail 355 to either the called party or a third party, the Dialog Manager 322 generates a voice response 313 for Caller 302 that is played by the Audio I/O 303, and waits for Caller 302's next voice input.

If the task is to transfer the call 336 to the called party's second phone, or to a third party, the call is transferred and the personal representative's session with Caller 302 is terminated 337.

Figure 4:
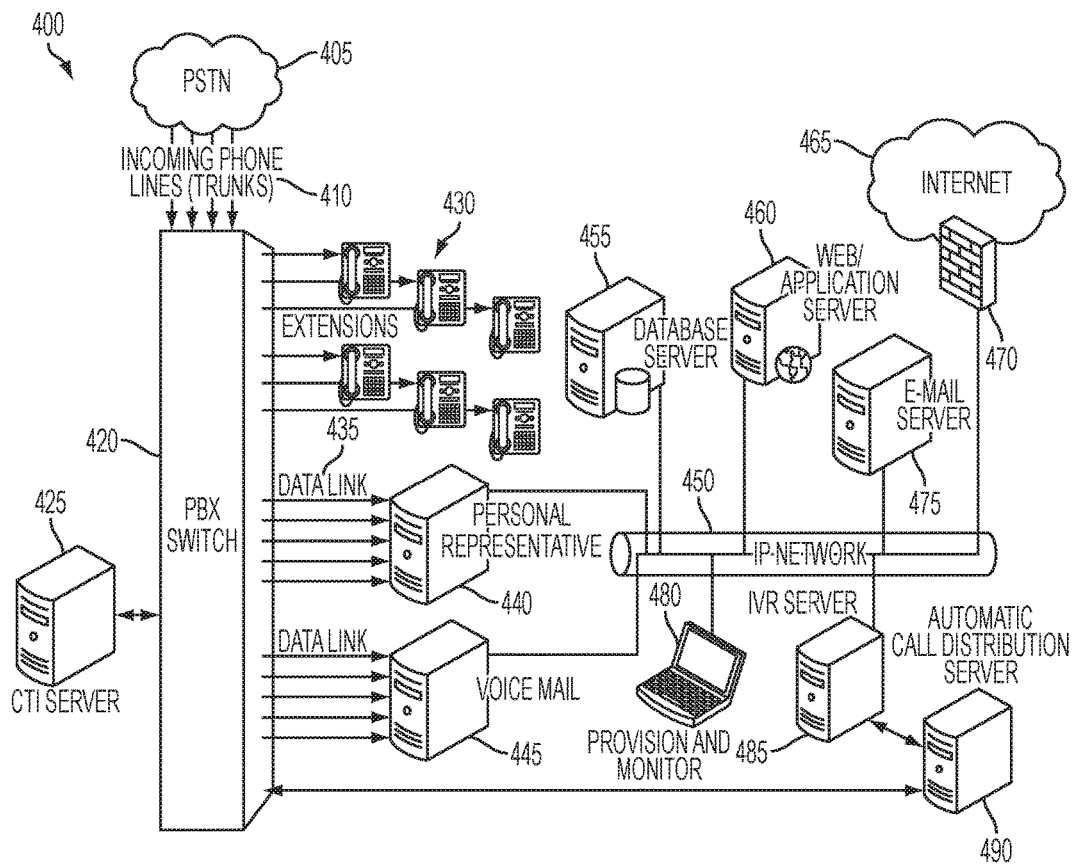
FIG. 4 illustrates an example architecture view of the present solution installed in a company's private telephone network.

In some embodiments, the personal representative is a service installed in a company's private network. FIG. 4 illustrates a personal representative system installed in an example traditional private network 400. An incoming phone call from PSTN 405 arrives from an incoming Phone Line 410 at PBX switch 420. In some embodiments, the private network has an IVR Server 485 that welcomes all callers and helps the caller decide as the where the call should be routed.

PBX Switch 420 routes the call to one of the company's private extensions 430. Computer Telephony Integration (CTI) Server 425 and Automatic Call Distribution Server (ACD) 490 direct where the PBX should route the call. In some embodiments, PBX 420 contains the software and routing logic and CTI Server 425 and ACD Server 490 are not necessary. If the call is not answered, CTI Server 425 looks up where to route the call. The call may be routed to either the Voice Mail Server 445 or Personal Representative 440, depending on the lookup information retrieved for the person at the intended extension.

The Personal Representative 440, Voice Mail 445, Database Server 455, Web/Application Server 460, E-mail Server 475, and IVR Server are connected to an internal IP network 450. The IP Network 450 is connected to the Internet 465 thru firewall 470. For this embodiment, a Laptop or PC 480 is also connected to IP Network 450. Each person with a phone extension 430 can access the associated Personal Representative 440 account stored on Web/Application Server 460 from Laptop or PC 480. A visual application for creating and updating the application and knowledge domain, call history, and usage statistics are available for each person's account.

Database Server 445 stores the Personal Representative 440's knowledge domain and application for the person at each extension. Web/application Sever 460 retrieves the knowledge domain and application files from Database Server 445 for the Personal Representative 440 when the Personal Representative 440 starts a session, after the Personal Representative receives caller information thru Data Link 435.

Each person with a phone extension has an e-mail account on E-Mail Server 475. If requested by the caller, the Personal Representative directs the E-Mail Server 475 to send an SMS, MMS, or e-mail message from the called party's account. An SMS or MMS message can be sent from E-mail Server by substituting an e-mail address with the intended receiver's mobile phone number.

Figure 5:
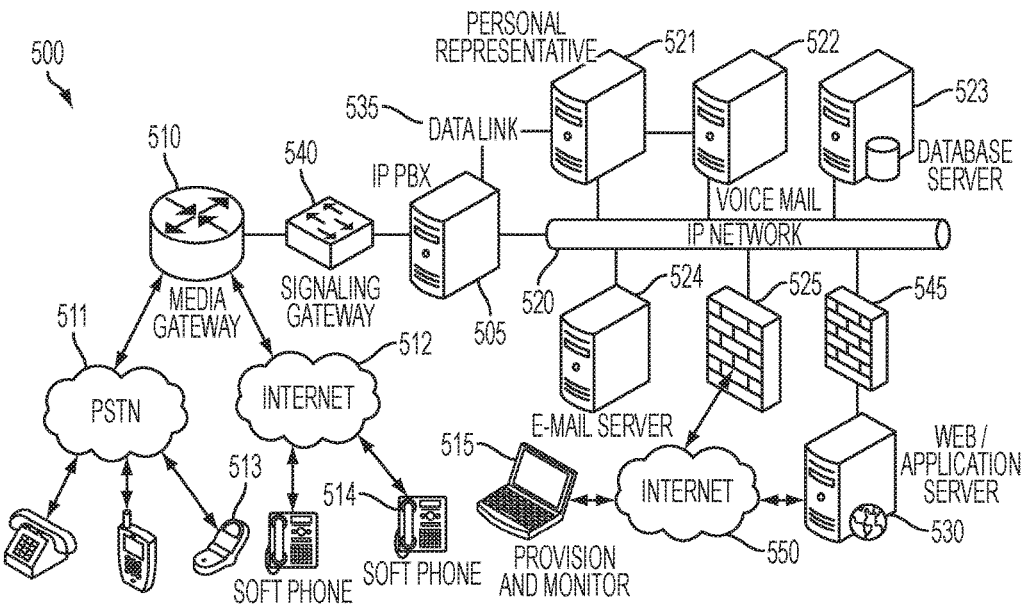
FIG. 5 illustrates an example architecture view of the present solution as a service in the cloud.

In some embodiments, the personal representative is a service installed in the cloud. This is the preferred embodiment of this solution. FIG. 5 illustrates an exemplary architecture of a Personal Representative cloud service 500. A Media Gateway 510 converts the PSTN 511 media streams originating from mobile and landline phones 513, and Internet 512 media streams originating from soft phones, to a common Internet format. For this embodiment, the Media Gateway 510 includes a Signaling Gateway 540 used to transfer signaling messages from the PSTN 511 to the IP PBX 505, also known as the Media Gateway Controller. The Media Gateway 510, Signaling Gateway 540, and IP PBX 505 together comprise a Soft Switch and may be implemented as a single server entity. The Media Gateway Control Protocol (MGCP) is used for signaling and communication between the IP PBX 505 and Media Gateway 540. The IP PBX 505 receives signaling information, such as the phone number ringing, forwarded from the Media Gateway 510 to the Signaling Gateway 540. The IP PBX 505 looks up the phone number and retrieves the called party's account information. If the intended call was unavailable and the called party has phone calls forwarded to the Personal Representative when the phone is not answered, the IP PBX 505 initiates a SIP session between Media Gateway 510 and Personal Representative 521. At the same time, the IP PBX 505 sends the phone number that is ringing across Data Link 535 to the Personal Representative 521. The Personal Representative requests the application associated with the phone number that is ringing from Web/Application Server 530 and answers the phone call.

The Personal Representative 521, Voice Mail 522, Database Server 523, Web/Application Server 530, and E-mail Server 524 are connected to an internal IP network 520. IP Network 520 is connected to the Internet 550 thru firewall 525. Users can access their accounts stored on Web/Application Server 530 from Laptop or PC 515. The Web/

Application Server resides outside the IP Network 520's firewall 525 and is connected securely thru firewall 545 to internal IP Network 520.

Figure 6:
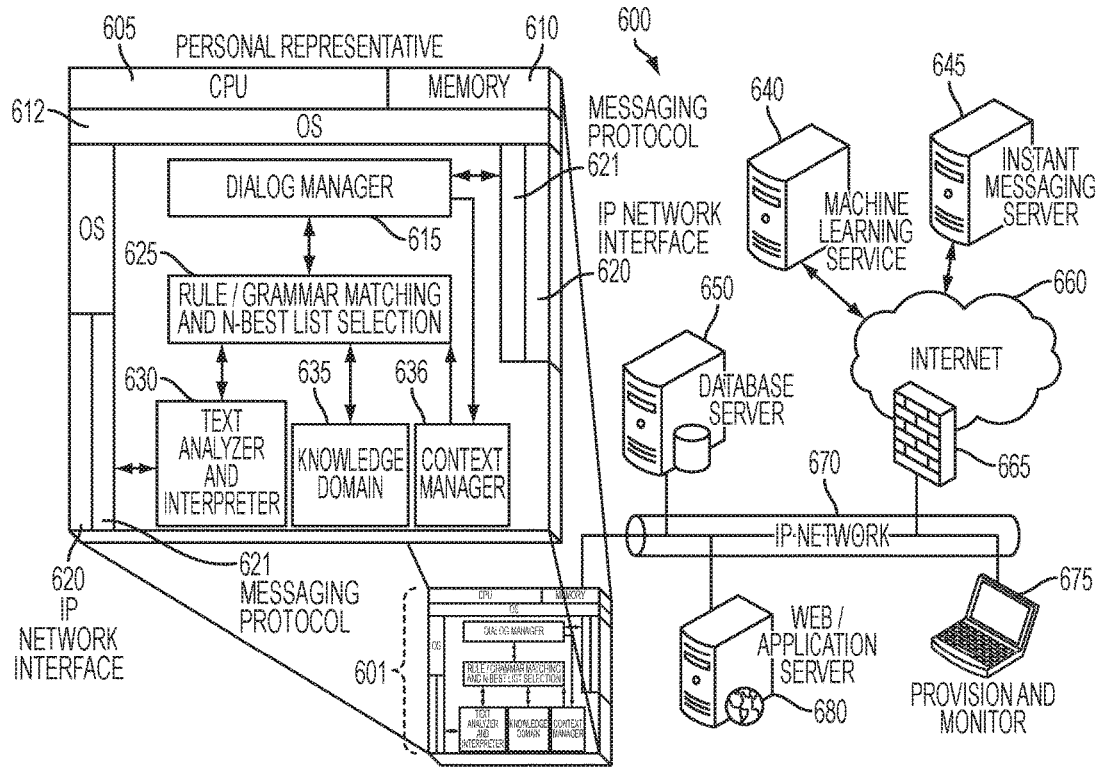
FIG. 6 illustrates an example architecture view of the present solution as an instant messaging client.

In some embodiments, the present solution is an Instant Messaging (IM) client that can participate in meetings and discussions that concern the personal representative's knowledge domain. FIG. 6 illustrates an example architecture view 600 of a Personal Representative 601 configured to interact with one or more IM clients.

As with other embodiments, the Personal Representative 601 has a CPU 605, Memory 610, and an OS 612 that runs the Personal Representative 601 software application and manages IP Network Interface 620. The IM session may be initiated by the Personal Representative 601 or by the first IM message received by Instant Messaging Server 645. As with the other embodiments, a Dialog Manager 615 instance is created and application and knowledge domain files are retrieved from the Web/Application Server 680 and Database Server 650. The Messaging Protocol Interpreter 621 processes IM messages received thru IP Network Interface 620. After processing the IM protocol used to send and receive IM messages, such as XMPP, the Messaging Protocol Interpreter 630 forwards the text of the IM message to the Text Analyzer and Interpreter 630. The output of the Text Analyzer and Interpreter 630 is processed for understanding by Rule/Grammar matching and N-Best List selection 625.

Rule/Grammar matching and N-Best selection 625 selects the grammar/rule that best matches one of the grammars, or rules, stored in Knowledge Domain 635, with optional assistance from Machine Learning Service 640. Machine Learning Service 640 adjusts the grammars, or rules, stored with Knowledge Domain 635 based on an analysis of a large set of text inputs from many users.

As with other embodiments of the present solution, a Context Manager 636 module maintains the conversation context that is updated by Dialog Manager 615. Rule/Grammar Matching and N-best List selection 625 retrieves the context from Context Manager 636 when it selects the best match out of the N-Best List provided by Text Analyzer and Interpreter 630.

As with other embodiments of the present solution, the Personal Representative 601, Database Server 650 and Web/Application Server 650 are connected to internal IP Network 670. IP Network 670 is connected to the Internet 660 thru firewall 665. A Laptop or PC 675 connected to IP Network 670 can access an application installed on Web/Application Server that will create and update the knowledge domain and application interpreted by the Dialog Manager 615. In another embodiment of architecture view 600, Web/Application Server can be accessed by Laptop or PC 675 from the Internet 660. Although the Web/Application Server resides outside of firewall 665 it is connected securely to IP Network 670.

Figures 1, 7:
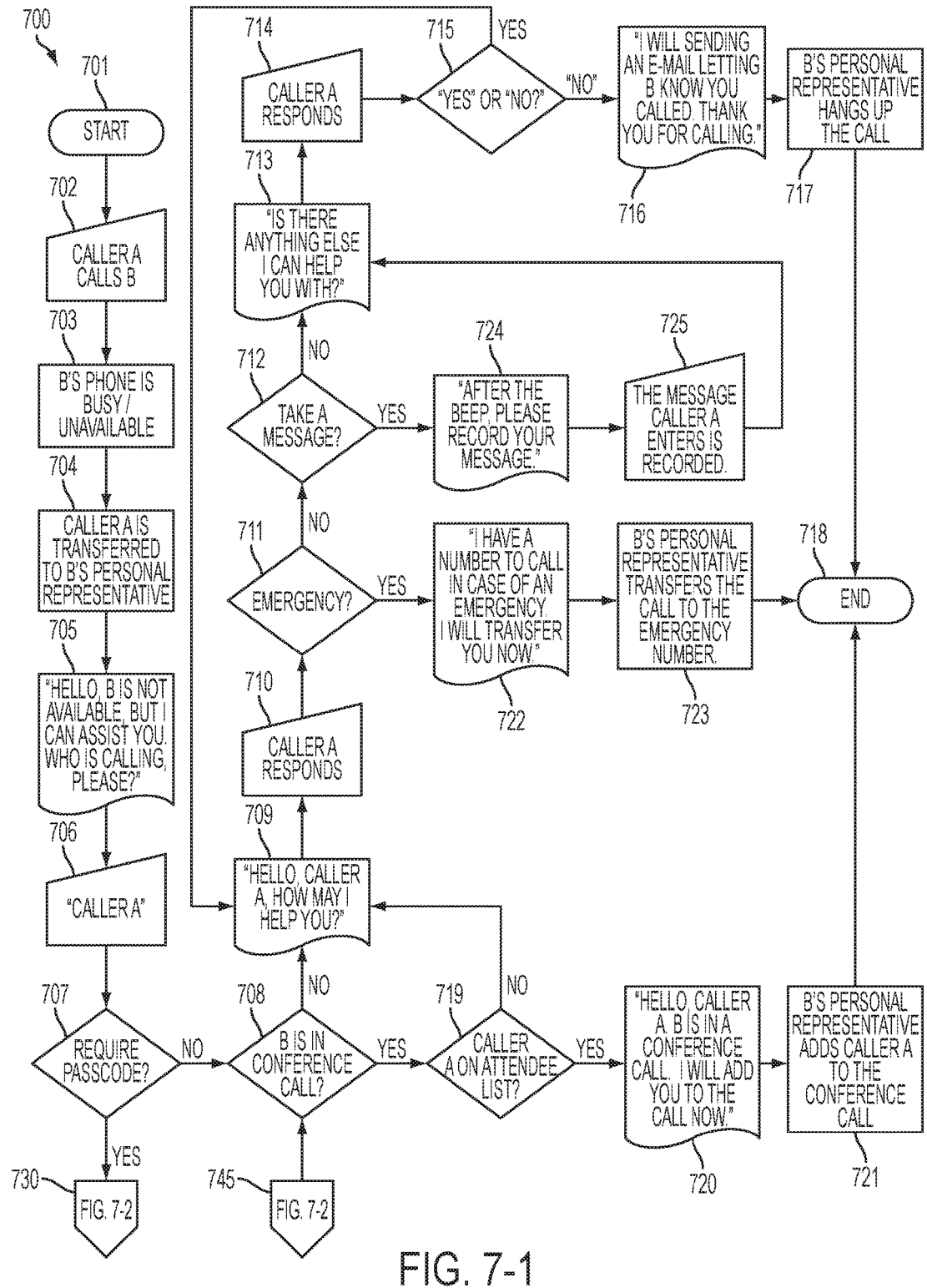
Figures 2, 7:
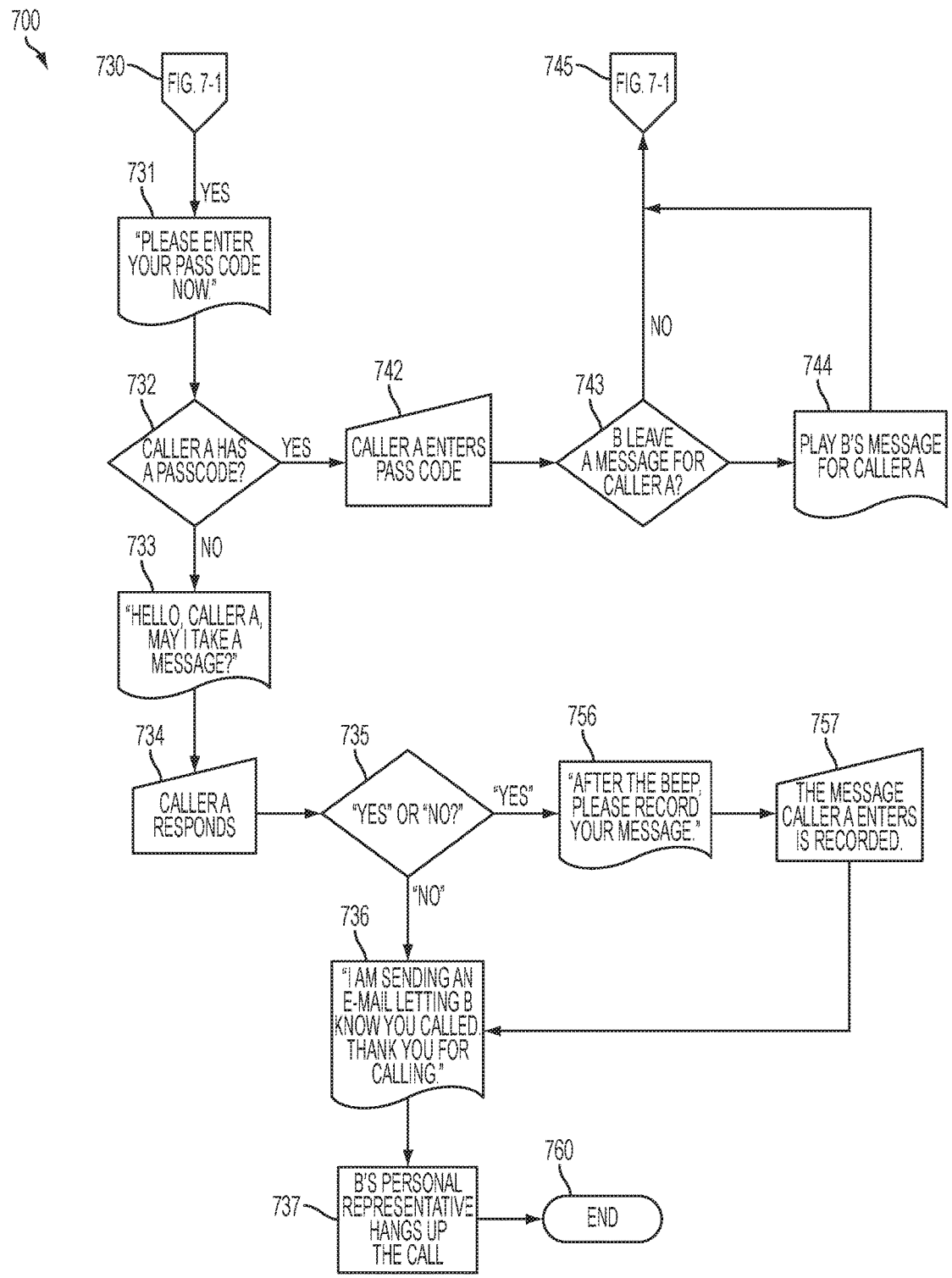

FIG. 7-1 illustrates the control flow of an example application 700 that is run by a personal representative. At Start 701 Caller A calls B 702. B's phone is busy or unavailable 703 and Caller A is transferred to B's Personal Representative 704. B's Personal Representative answers the call and asks Caller A for his or her name 705. Caller A responds with the name "Caller A" 706. B's Personal Representative checks whether a passcode is required from Caller A 707. If a passcode is not required, and B is in a conference call 708, and Caller A is on the conference attendee list 719, B's Personal Representative informs Caller A with a message 720 that Caller A is about to be added to the conference call 721. The session ends 718 after Caller A joins the conference call. If B is not in a conference call 708 or not on the attendee list 719 then B's Personal Representative asks how it may help Caller A 709. If Caller A responds that there is an emergency 711, B's Personal Representative informs Caller A that it has an emergency number to call 722 and transfers Caller A to the emergency phone number 723. The session ends 718 after Caller A is transferred to the emergency number.

If Caller A does not respond that there is an emergency 711 and asks to leave a message 712, B's Personal Representative tells Caller A to record the message after the beep 724. After B's Personal Representative detects that Caller A is finished recording the message 725, B's Personal Representative asks Caller A if he or she would like more help 713. If the response from Caller A 714 is "yes" then B's Personal Representative asks how it may help Caller A 709.

If after B's Personal Representative asks Caller A if he or she would like more help 713, Caller A responds "no" then B's Personal Representative informs Caller A that an e-mail will be sent to B letting B know that Caller A called. B's Personal Representative sends the e-mail to B and hangs up the call 717. The session with Caller A ends 718.

FIG. 7-2 continues with the control flow example of FIG. 7-1 beginning at 730 with B's Personal Representative asking Caller A to ender a passcode 731 if a passcode is required 707. If Caller A has a passcode and Caller A enters the correct passcode, B's Personal Representative checks whether B has a message for Caller A 743. If B has a message for caller A then B's message is played 744. The control flow returns to FIG. 1 with B's Personal Representative checking whether B is in a conference call 708. If B does not have a message for Caller A the control flow immediately returns to FIG. 1 beginning with 708.

If Caller A does not have a passcode 732, B's Personal Representative asks Caller A if he or she would like to leave a recorded message 733. If Caller A responds 734 with "yes" 735 then B's Personal Representative tells Caller A to record the message after the beep 756. After B's Personal Representative detects that Caller A is finished recording the message 757, B's Personal Representative informs Caller A that an e-mail will be sent to B letting B know that Caller A called 736. B's Personal Representative sends the e-mail to B and hangs up the call 737. The session ends 760.

If Caller A responds "no" 735 when asked if he or she would like to leave a message 733, B's Personal Representative informs Caller A that an e-mail will be sent to B letting B know that Caller A called 736. B's Personal Representative sends the e-mail to B and hangs up the call 737. The session ends 760.

In one embodiment, a method, system and non-transitory computer readable medium comprise one or more of: receiving a call at a device, when the call is unanswerable, forwarding, by the device, the call to a personal representative, detecting, by a telephony network interface of the personal representative, ringing, performing, by a communication programming interface, directing the network interface to answer the call, starting an instance of a dialog manager and directing the dialog manager to load an application and knowledge domain associated with the answered call, forwarding, to the communication programming interface, a language model and grammars to be installed with an automatic speech recognition module, outputting, from the automatic speech recognition module, a list of matches with a corresponding confidence score, providing a best match to the dialog manager, updating, by the dialog manager, a dialog context and engaging in a dialog, by the personal representative, with a caller device based on the dialog context.

The process continues with one or more of: wherein the call is unanswerable when at least one of the device or a user of the device is at least one of busy or not available, wherein the application and the knowledge domain is provided to the dialog manager by at least one of: an application server and a database server, wherein when the call is unanswerable, the dialog manager plays an initial prompt for a caller of the call, wherein the prompt is provided to the communication programming interface to be played by a text-to-speech module, wherein the automatic speech recognition module receives input from the caller and processes the input against at least one of the grammars and semantic analysis, wherein the list is given to the communication programming interface and forwarded to a grammar matching module, wherein at least one of the grammar matching module and a semantic analysis analyzes each match for accuracy against a conversation context maintained by the context manager and selects the best one.

The process further comprises one or more of: identifying the caller and providing, by the personal representative, the caller with caller-specific information available in the application, recognizing, by the personal representative, an emergency and providing the caller with emergency information available in the application, wherein the dialog between the caller and the personal representative continues until at least one of the following occurs: the call is terminated, the call is transferred and the call is added to another call, wherein, after one of the following occurs, the dialog manager requests the application server to unload the application.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
 receiving a call at a device;
 when the call is unanswerable, forwarding, by the device, the call to a personal representative device;
 detecting, by a telephony network interface of the personal representative device, ringing;
 performing, by a communication programming interface:
 directing the network interface to answer the call;
 starting an instance of a dialog manager; and directing the dialog manager to load an application and knowledge domain associated with the answered call;

forwarding, to the communication programming interface, a language model and grammars to be installed with an automatic speech recognition module;

outputting, from the automatic speech recognition module, a list of matches with a corresponding confidence score;

providing a best match to the dialog manager;

updating, by the dialog manager, a dialog context;

engaging in a dialog, by the personal representative device, with a caller device based on the dialog context; and recognizing, by the personal representative device, an emergency and providing the caller with emergency information available in the application.

2. The method of claim 1, wherein the call is unanswerable when at least one of the device or a user of the device is at least one of busy or not available.

3. The method of claim 1, wherein the application and the knowledge domain is provided to the dialog manager by at least one of: an application server and a database server.

4. The method of claim 1, wherein when the call is unanswerable, the dialog manager plays an initial prompt for a caller of the call.

5. The method of claim 4, wherein the prompt is provided to the communication programming interface to be played by a text-to-speech module.

6. The method of claim 5, wherein the automatic speech recognition module receives input from the caller and processes the input against at least one of the grammars and semantic analysis.

7. The method of claim 1, wherein the list is given to the communication programming interface and forwarded to a grammar matching module.

8. The method of claim 7, wherein at least one of the grammar matching module and a semantic analysis analyzes each match for accuracy against a conversation context maintained by the context manager and selects the best one.

9. The method of claim 1, comprising identifying the caller and providing, by the personal representative device, the caller with caller-specific information available in the application.

10. The method of claim 1, comprising providing secure access to calendar and contact information of the user of the device, the information stored in a cloud-based storage environment.

11. The method of claim 1, wherein the dialog between the caller and the personal representative device continues until at least one of the following occurs:
the call is terminated;
the call is transferred; and
the call is added to another call.

12. The method of claim 9, wherein, after one of the following occurs, the dialog manager requests the application server to unload the application.

13. A non-transitory computer readable medium comprising instructions that, when read by a processor, cause the processor to perform:
receiving a call at a device;
when the call is unanswerable, forwarding, by the device, the call to a personal representative device;
detecting, by a telephony network interface of the personal representative, ringing;
performing, by a communication programming interface:
directing the network interface to answer the call;
starting an instance of a dialog manager; and
directing the dialog manager to load an application and knowledge domain associated with the answered call;
forwarding, to the communication programming interface, a language model and grammars to be installed with an automatic speech recognition module;
outputting, from the automatic speech recognition module, a list of matches with a corresponding confidence score;
providing a best match to the dialog manager;
updating, by the dialog manager, a dialog context;
engaging in a dialog, by the personal representative device, with a caller device based on the dialog context; and
recognizing, by the personal representative device, an emergency and providing the caller with emergency information available in the application.

14. The non-transitory computer readable medium of claim 13, wherein the call is unanswerable when at least one of the device or a user of the device is at least one of busy or not available.

15. The non-transitory computer readable medium of claim 13, wherein the application and the knowledge domain is provided to the dialog manager by at least one of: an application server and a database server.

16. The non-transitory computer readable medium of claim 13, wherein when the call is unanswerable, the dialog manager plays an initial prompt for a caller of the call.

17. The non-transitory computer readable medium of claim 16, wherein the prompt is provided to the communication programming interface to be played by a text-to-speech module.

18. The non-transitory computer readable medium of claim 17, wherein the automatic speech recognition module receives input from the caller and processes the input against at least one of the grammars and semantic analysis.

19. The non-transitory computer readable medium of claim 13, wherein the list is given to the communication programming interface and forwarded to a grammar matching module.

20. A system, comprising:
a device configured to receive a call;
when the call is unanswerable, the device is configured to forward the call to a personal representative device;
a telephony network interface of the personal representative device configured to detect ringing;
a communication programming interface configured to:
direct the network interface to answer the call;
start an instance of a dialog manager; and
direct the dialog manager to load an application and knowledge domain associated with the answered call;
wherein a language model and grammars to be installed with an automatic speech recognition module are forwarded to the communication programming interface;
wherein a list of matches with a corresponding confidence score are output from the automatic speech recognition module;
wherein a best match is provided to the dialog manager;
wherein the dialog manager updates a dialog context;
wherein the personal representative device engages in a dialog with a caller device based on the dialog context; and
wherein the personal representative device recognizes an emergency and provides the caller with emergency information available in the application.

* * * * *